United States Patent [19]

Reeves, Jr.

[11] Patent Number: 4,873,650

[45] Date of Patent: Oct. 10, 1989

[54] WATER FLOW CONTROLLER

[76] Inventor: Charles H. Reeves, Jr., 6263 Brightwell Pl., Acworth, Ga. 30101

[21] Appl. No.: 39,461

[22] Filed: Apr. 16, 1987

[51] Int. Cl.⁴ .......................... G01F 1/00; F16K 31/48
[52] U.S. Cl. ..................... 364/510; 364/141; 364/143; 239/69; 239/70; 417/9
[58] Field of Search ............... 364/141, 143, 144, 510; 239/69, 70; 137/624.11; 417/3, 9; 222/14, 16, 22

[56] References Cited

U.S. PATENT DOCUMENTS

| | | | |
|---|---|---|---|
| 2,456,493 | 12/1948 | Drane et al. | 161/7 |
| 3,520,332 | 7/1970 | Willard | 137/624.13 |
| 3,887,110 | 6/1975 | Porter | 222/16 |
| 4,012,673 | 3/1977 | Saaren et al. | 361/196 |
| 4,270,574 | 6/1981 | Graber | 137/624.11 |
| 4,280,530 | 7/1981 | Yi | 137/624.11 |
| 4,336,590 | 6/1982 | Jaco et al. | 364/418 |
| 4,412,557 | 11/1983 | Schmid | 137/624.13 |
| 4,522,237 | 6/1985 | Endo et al. | 222/14 |
| 4,590,576 | 5/1986 | Elpiner | 137/624.11 |
| 4,646,224 | 2/1987 | Ransburg et al. | 417/12 |
| 4,648,043 | 3/1987 | O'Leary | 364/510 |
| 4,657,486 | 4/1987 | Stemple et al. | 417/12 |
| 4,700,568 | 10/1987 | Sleffel | 364/510 |
| 4,722,478 | 2/1988 | Fletcher et al. | 364/420 |

Primary Examiner—Felix D. Gruber
Assistant Examiner—Ellis B. Ramirez
Attorney, Agent, or Firm—Thomas & Kennedy

[57] ABSTRACT

A water flow controller times periods of uninterrupted water flow through a valve and closes the valve whenever a timed period exceeds a preselected duration.

14 Claims, 3 Drawing Sheets

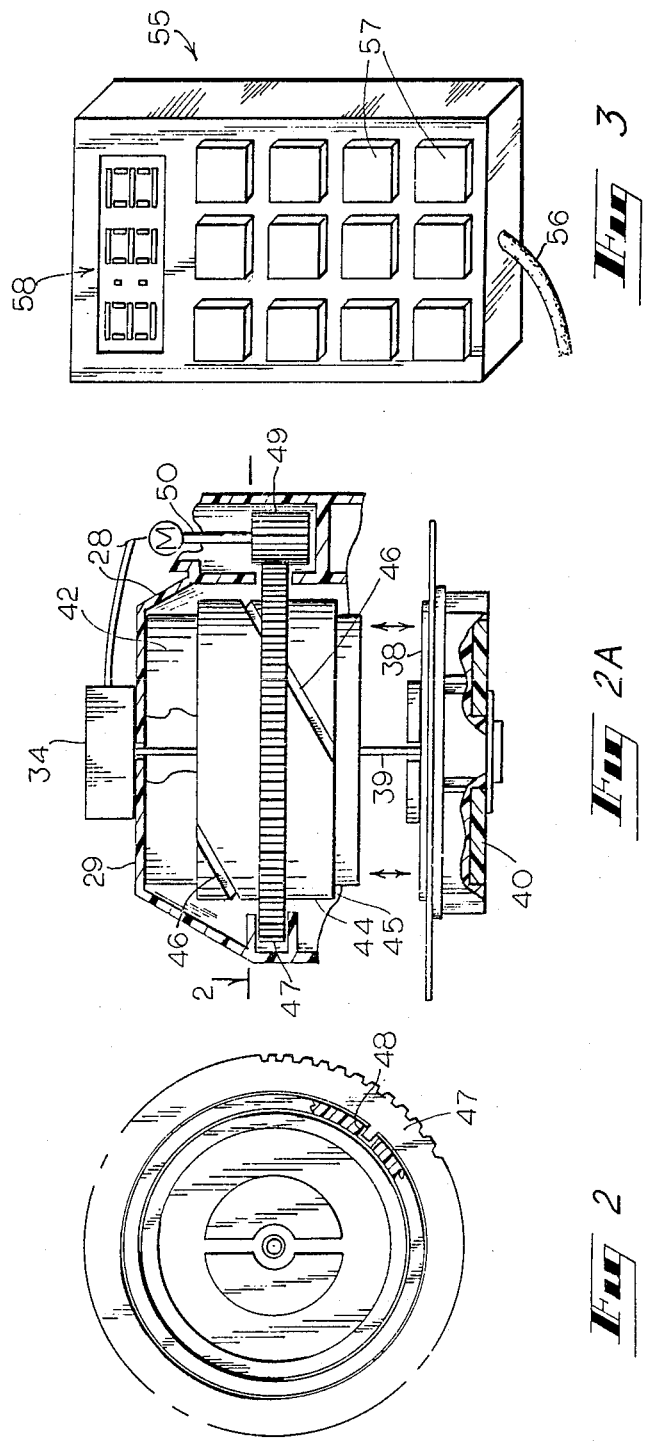

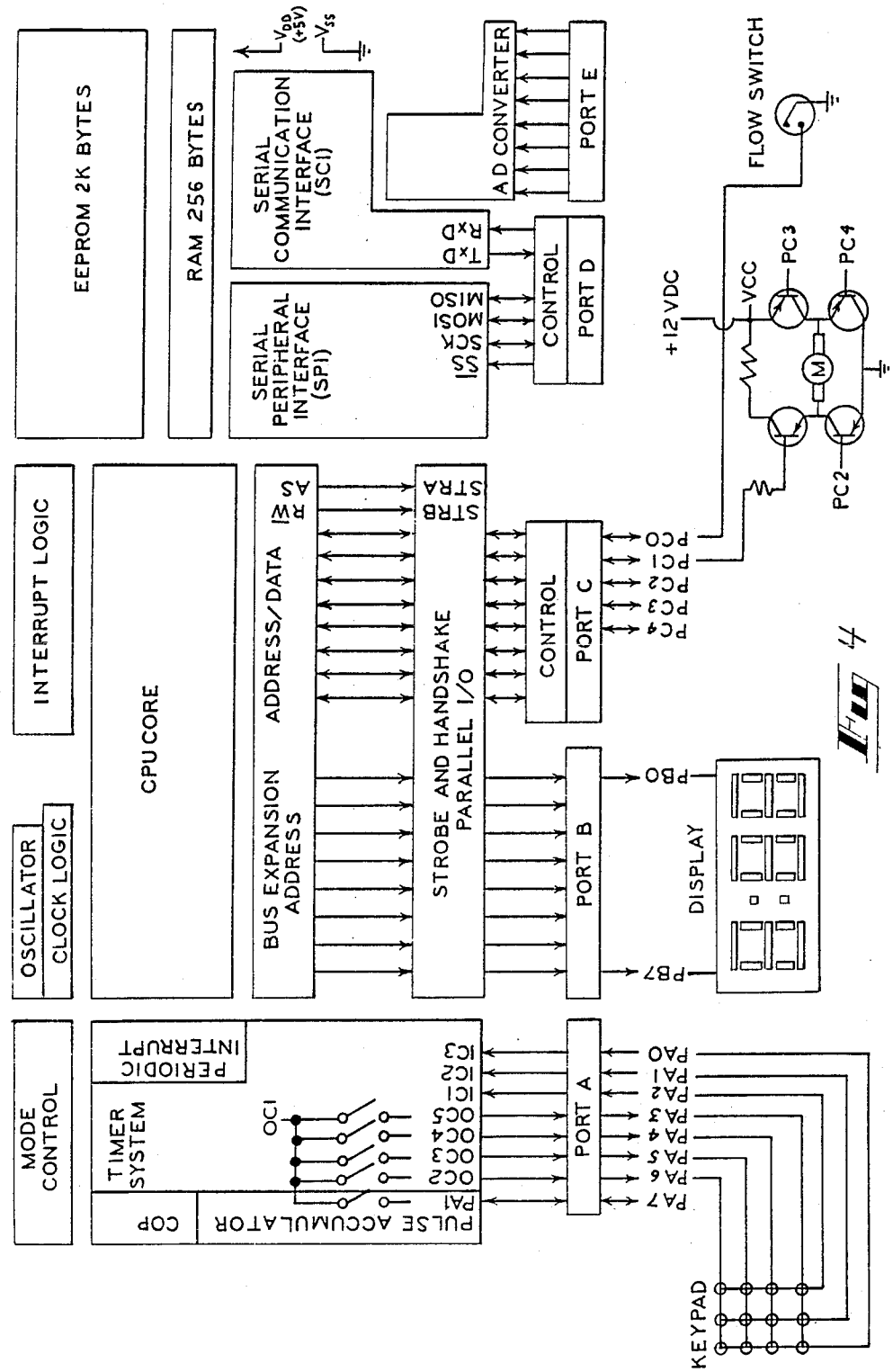

WATER FLOW CONTROLLER

TECHNICAL FIELD

This invention relates generally to means for controlling the flow of water, and particularly to means for limiting periods of uninterrupted flow on an automated basis.

BACKGROUND OF THE INVENTION

It sometimes occurs that a fluid is caused to flow through a conduit for an extended, unintended period of time. For example, one may turn on a water line in a home and leave the home having forgotten to shut it off. This, of course, creates waste and unnecessary expense. In other cases water lines may rupture as from the effects of subfreezing weather conditions whereupon water that had been shut off begins to flow through breaches in the lines. When this occurs not only is waste created but the water is likely to damage the structure in which the water lines are located. In some cases, as with mountain lodges that are only infrequently used in winter, water can flow undetected for substantial periods of time.

Heretofore, timing valves have been devised that enable one to open a water line or the like for a selected period of time at the conclusion of which the valve is automatically closed. Lawn sprinkler systems, for example, often employ such time controlled valves like those shown in U.S. Pat. Nos. 2,456,493, 4,012,673 and 4,270,574. Some home appliances, such as laundry machines, also employ time controlled valves as shown in U.S. Pat. No. 3,520,332.

The just described types of time controlled valves cannot be well used to solve the problem first mentioned since these valves have to be initially actuated by the user. In addition, it would obviously be impractical to substitute a time controlled valve for every faucet and valve in a home environment, including those already on some form of automatic control as with washing machines, hot water heaters and the like.

Accordingly, it is seen that a need exists for a controller which may be used to limit the flow of water or other fluid that overcomes the just described problem. It is to the provision of such a controller that the present invention is primarily directed.

SUMMARY OF THE INVENTION

In one form of the invention a water flow controller comprises a sensor for sensing commencement and termination of water flow. A timer is coupled with the sensor for timing uninterrupted periods of water flow sensed by the sensor. The controller further comprises a valve and means for actuating the valve in response to the timer timing an uninterrupted period of water flow that exceeds a selected duration of time.

In another form of the invention a water flow controller comprises a valve having a body adapted to be incorporated into a water line in which body a movable valve member is mounted for movement between a position closing the valve and a position opening the valve. Means are included for sensing movements of the valve movable member between the valve closed and valve open positions. Timer means are provided for timing durations of time that the valve movable member is in the valve open position. The controller further includes means for forcing the valve movable member to the valve closed position in response to the timer means timing a continuous period of time that the valve movable member is in the valve open position that exceeds a preselected period of time.

In yet another form of the invention a water flow controller comprises a valve, sensor means for sensing commencement and termination of water flow through the valve, and means for opening and closing the valve. Computer means are provided for computing durations of time in which water is sensed by the sensor means to flow continuously through the valve and for generating a valve closed signal for transmission to the valve opening and closing means in response to computing a duration that exceeds a preselected period of time.

BRIEF DESCRIPTION OF THE DRAWING

FIG. 2A is a side elevational view, shown partly in cross-section, of a portion of the apparatus illustrated in FIG. 1 while FIG. 2 is a plan view of the apparatus taken along plane 2—2.

FIG. 3 is a perspective view of another component of the controller that is electrically coupled with the controller portion illustrated in FIG. 1.

FIG. 4 is a schematic diagram of electronic portions of the water flow controller.

DETAILED DESCRIPTION

Figure 1:
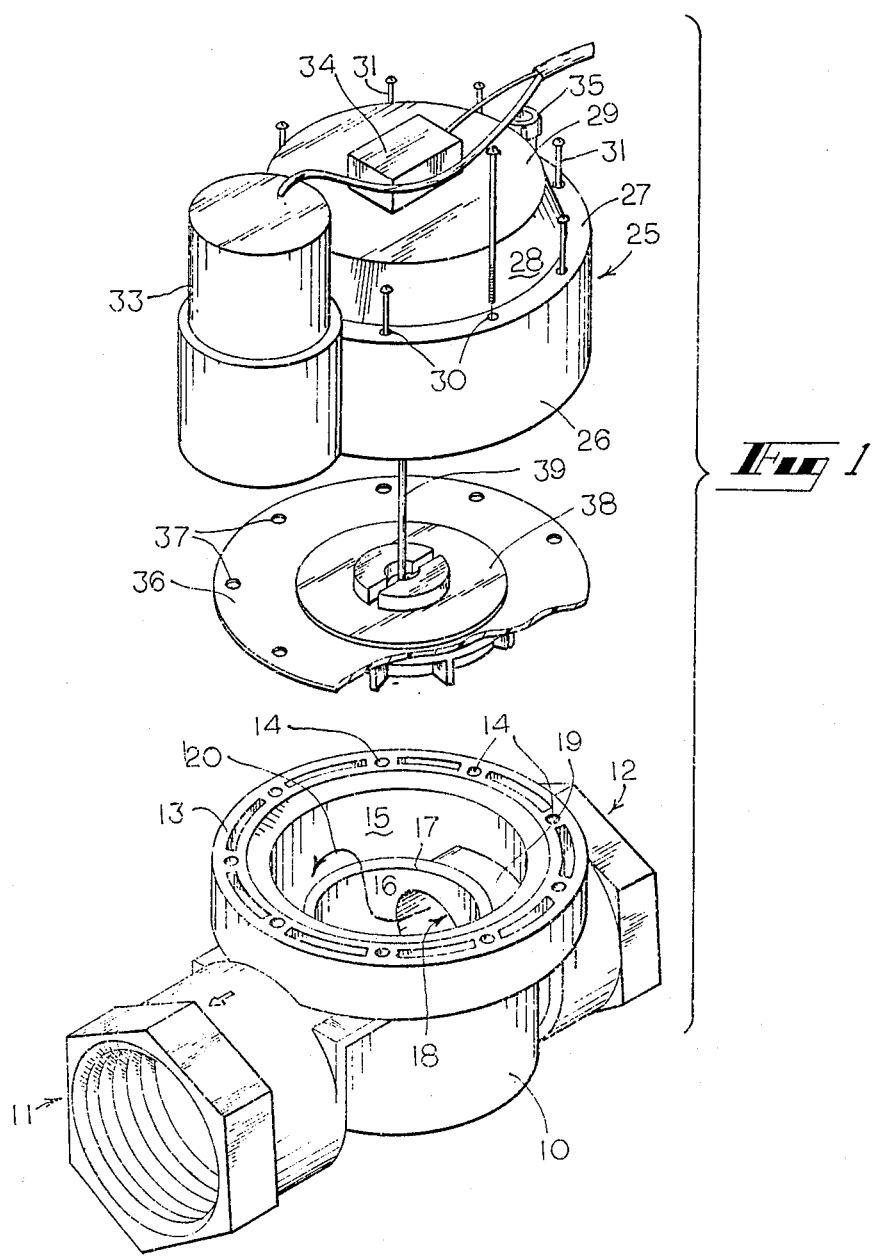
FIG. 1 is an exploded view, in perspective, of a portion of a water flow controller that embodies principles of the present invention.

With reference next to the drawing, there is shown a water flow controller that embodies principles of the invention in a preferred form. The controller is seen to comprise a valve that includes a body or base 10 having an internally threaded outlet 11 formed on one side and an internally threaded inlet 12 formed on the other side. The bottom of the base 10 is closed while the top is open at a planar, angular upper surface or lip 13 that is formed with an angular array of threaded holes 14. A generally cylindrical interior side wall 15 of the base coaxially surrounds in spaced relation a cylindrical wall 16 of an inner conduit that has a terminal lip 17 which functions as a valve seat. An orifice 18 is formed in the side wall 16 to provide fluid communication with the inlet 12 through a throat indicated at 19. So constructed, it is seen that water flowing into the valve body or base through inlet 12 passes through the throat 19 and then upwardly through the inner conduit as shown by arrow 20 to flow over the top of its lip 17. The water then flows downwardly between the spaced walls 15 and 16 to the outlet 11 through an unshown orifice formed in the wall 15.

With continued reference to FIG. 1, the controller is further seen to include an annular cap, indicated generally at 25, having a cylindrical side wall 26 that merges at a ledge 27 to a conical side wall 28 that in turn unitarily merges with a flat top 29. A set of holes 30 is provided in the ledge 27 through which a set of screws 31 may be passed in securing the cap 25 tightly upon the base 10. An electric motor housing, indicated generally at 33, is mounted to one side of the cap 25 while a switchbox 34 is mounted upon the cap top 29. A bleed line 35 is mounted to the ledge 27. Electrical wiring extends from the motor housing 33 and switchbox 34 to a control box that is shown in FIG. 3.

The controller is also seen to include a flexible diaphragm 36 having a set of holes 37 formed therein through which the screws 31 may pass. The flexible diaphragm 36 extends radially outwardly from a rigid disc 38 to which an actuation pin or rod 39 is mounted. As best seen from FIG. 2A, the disc 38 is provided with an annular washer 40 for water-tight sealing engagement atop the valve seat 17. When the movable member formed by the disc and diaphragm is positioned with washer 40 firmly upon the valve seat 17, flow through the valve is stopped and the valve is considered closed. Conversely, when the washer 40 is elevated above the valve seat, as permitted by the flexible movement of the diaphragm 36 accompanied by the movement of disc 38, water may flow through the valve along the path indicated by arrow 20.

With particular reference to FIGS. 2 and 2A, the flow controller is further seen to include a cylindrical bushing 42 that extends downwardly from the inside of the cap top 29. A collar 44 is slidably mounted about the bushing 42 with its bottom 45 functioning as a stop. The collar is formed with two spiral grooves 46 in its exterior surface. An annular gear 47 is mounted about the collar 44 that has two followers 48 that project radially inwardly into the grooves 46. A spur gear 49 is in mesh with the gear 47 for driving it. The spur gear is rigidly mounted to the bottom of a drive shaft 50 that extends downwardly from an electric motor M that is mounted within the motor housing 33.

With this construction it is seen that the motor M may cause the gear 47 to rotate and thereby move the collar 44 upwardly or downwardly upon the bushing 44 so as to drive its lower end stop 45 into and out of engagement with the top of the disc 38. When the motor drives the stop 45 downwardly upon the disc 38, it forces the disc and its washer into seating engagement upon the valve seat 17 whereupon water can no longer flow through the valve. Conversely, when the collar and stop is raised upwardly the disc may rise and fall in conventional check valve action as dictated by the direction of water flow under pressure.

As shown in FIG. 3, the controller further includes a control box, indicated generally at 55, that here is structurally separate from the previously described valve and its associated apparatus but which is electrically coupled thereto by a cord 56. The control box includes a keyboard comprised of a set of keys 57 and an alphanumeric display panel 58. A battery and a small computer are housed within the control box 55. The computer here is a type MC68HC11 microprocessor produced by The Motorola Corporation. A schematic illustration of the computer is shown in FIG. 4.

The computer is coupled with the keyboard, the display, the motor, a flow switch and power supply, as illustrated. More particularly, the keyboard, which includes a reset function, is seen to be coupled with port A while the alphanumerical display is coupled with port B. Five and twelve volt D.C. power is provided, as shown. An electric flow switch, housed within switchbox 34, is connected with port C. Its movable contact blade is actuated by being coupled with the actuation rod 39 that extends upwardly from the disc 38.

The motor M is shown in FIG. 4 to be controlled by a Darlington pair circuit that includes a network of four transistor switches. The circuit operates in its conventional manner. Specifically, by switching on the transistors controlled from PC1 and PC4 power of one polarity is coupled across motor M. Conversely, by turning on the transistors connected to PC2 and PC3 power of opposite polarity is coupled across the motor. In this manner the computer may cause the motor to operate bidirectionally or not at all in driving collar 44 and its associated stop 45 reciprocally so as either to force the valve to a closed position or to permit it to close and open as a normal check valve.

For operation a selected time period, 4 hours as one random example, may be inputted into computer memory through manipulation of the keyboard. The inputted time is visually verified by reference to the display panel 58 which stays illuminated for a brief period of time and then self extinguishes. If the controller has previously operated so as to close the valve, a reset function is entered by actuation of one of the keys. In this event the motor M causes the collar 44 to retract to its position illustrated in FIG. 2A, spaced from the disc 38.

Each time water commences to flow through the valve body 10 its pressure lifts the disc 38 off of the valve seat 17 and enables the flow of water to pass out of the body 10 through outlet 11. Each time this occurs, and the disc 38 is raised, the actuation pin or rod 39 operates the flow switch which in turn initiates the computer timer system. Should flow terminate within a reasonably short period of time, i.e. less than the selected 4 hour period, the disc 38 descends causing pin 39 to reactuate the switch. When this occurs the timer function ceases and the timer is automatically reset to zero.

It should be noted that during the just described sequence of events the stop provided at the bottom end of the collar has remained stationary in the position shown in FIG. 2A. This cycling of the timer may, and indeed should, be expected to occur many times. However, in the event the computer times a period of uninterrupted flow that exceeded the preset time, it generates a signal on control port C placing power across the motor M. The motor then drives the spindle 49 which drives gear 47 which in turn causes the collar 44 to descend and bring its annular stop 45 into direct contact upon the disc 38 and force its washer 40 against valve seat 17, thereby closing the valve. At some time later the controller may be reset manually which action causes Motor M to drive the gears and collar in the reverse direction for a preset time and distance back to its normal position shown in FIG. 2A.

It thus is seen that a flow controller for a water line is provided which provides a means for preventing water from flowing continuously for a prolonged and most probably unintended and undesired period of time. It should, of course, be understood that the just described embodiment merely illustrates principles of the invention in one form. Many modifications, deletions and additions may be made thereto without departure from the spirit and scope of the invention as set forth in the claims. For a few expressly stated examples of such, the apparatus may be purely mechanical. It may employ valves of a type other than check valves. The controls may be mounted directly to the valve. The water flow sensor may be unconnected to the valve itself. And, of course, it may be used to control the flow of fluids other than water.

I claim:

1. A water flow controller for limiting undesired and unexpected flow of water resulting from the rupture of a water pipe or the like, and wherein the controller comprises, in combination, sensor means for sensing commencement and termination of water flow, timer means coupled with said sensor means for timing uninterrupted periods of water flow sensed by said sensing means, valve means, and means for actuating said valve means in response to said timer means timing an uninterrupted period of water flow that exceeds a selected duration.

2. The water flow controller of claim 1 wherein said valve means comprises a check valve having a flexible member, and wherein said sensor means is coupled with said check valve flexible member for sensing movements thereof.

3. The water flow controller of claim 2 wherein said actuating means comprises stop means coupled with motor means for driving said stop means into and out of a position inhibiting movement of said check valve flexible member from a closed position.

4. The water flow controller of claim 1 wherein said timer means comprises an electrically powered clock, and wherein said sensor means comprises electric switch means for switching said clock on and off.

5. The water flow controller of claim 4 wherein said valve means is a check valve having a movable component, and wherein said electric switch means is mechanically coupled with said check valve movable component.

6. The water flow controller of claim 5 wherein said valve actuating means comprises an electric motor coupled with stop means mounted for movement into and out of a position holding said valve means in a valve closed position.

7. A water flow controller for limiting undesired and unexpected flow of water resulting from the rupture of a water pipe or the like, and wherein the controller comprises a valve having a body adapted to be incorporated into a water line in which body a movable valve member is mounted for movement between a position closing said valve and a position opening said valve; means for sensing movement of said valve movable member between said valve closed and valve opened positions; timer means for timing durations of time that said valve movable member is in said valve open position, and means for forcing said valve movable member to said valve closed position in response to said timer means timing a duration of time that said valve movable member is located in said valve open position which exceeds a selected period of time.

8. The water flow controller of claim 7 wherein said valve is a check valve-type valve.

9. The water flow controller of claim 7 wherein said timer means comprises an electric clock coupled with on/off electric switch means that is operatively coupled with said valve movable member.

10. The water flow controller of claim 9 wherein said forcing means comprises a stop movably coupled with electric motor means, and wherein said controller further comprises means for actuating said electric motor means in response to said timer means having timed a duration exceeding the selected period of time.

11. A water flow controller for limiting undesired and unexpected flow of water resulting from the rupture of a water pipe or the like, and wherein the controller comprises a valve and sensor means for sensing commencements and terminations of substantial water flow through said valve, means for opening and closing said valve, and computer means for computing durations of time in which water is sensed by said sensing means to flow continuously through said valve and for generating a valve close signal for transmission to said valve opening and closing means in response to computing a duration having exceeded a preselected period of time.

12. A water flow controller in accordance with claim 11 further comprising keyboard means for inputting a preselected period of time into said computer means.

13. A water flow controller in accordance with claim 12 further comprising display means for displaying a preselected period of time inputted into said computer means.

14. A water flow controller in accordance with claim 11 wherein said valve opening and closing means comprises an electric motor operatively coupled with said computer means.

* * * * *